Nov. 12, 1940.   J. A. C. YULE   2,221,037
COLOR FILTER FOR PHOTOMECHANICAL PROCESSES
Filed April 22, 1937

← FILTER
TRANSMITTING A
PRIMARY COLOR
AND A
CORRECTING COLOR

John A. C. Yule
INVENTOR.

BY Newton M. Perkins
R. Frank Smith
ATTORNEYS

Patented Nov. 12, 1940

2,221,037

UNITED STATES PATENT OFFICE 2,221,037

COLOR FILTER FOR PHOTOMECHANICAL PROCESSES

John A. C. Yule, Rochester, N. Y., assignor to Eastman Kodak Company, Rochester, N. Y., a corporation of New Jersey Application April 22, 1937, Serial No. 138,350

8 Claims. (Cl. 95—81.5)

This invention relates to photomechanical process work and more particularly to the color filters employed in the making of color separation images of a multi-colored original for three or four-color processes.

In order to overcome the deficiencies in even the best contemporarily available colored inks employed in photomechanical process work, it is customary to introduce color correction by means of hand retouching or socalled "masking method of color correction."

It is an object of the invention to provide color separation negatives and a method of making them so that they will be particularly suitable for use in a process including masking. According to my invention, therefore, the abilities of the masking method will be more fully realized than heretofore.

It is an object of one embodiment of my invention to provide a special set of color filters which may be employed to make color separation negatives particularly adapted to be masked.

It is a further object of my invention to provide a method of determining the correct spectral transmission required by the special color filters and, hence, a method of making the filters.

Figure 1:
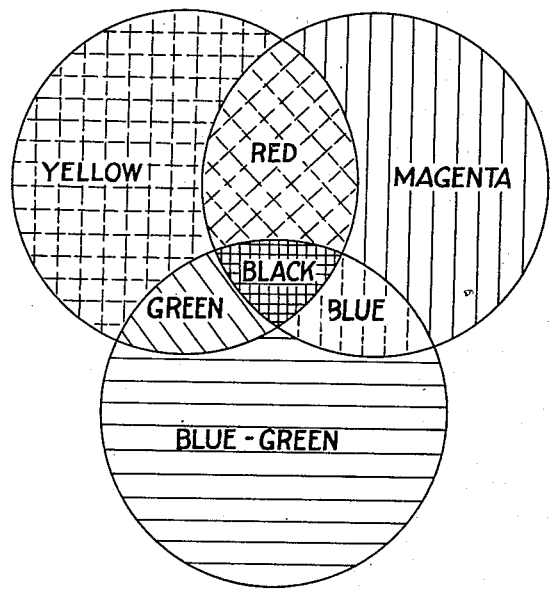

Other objects and advantages of my invention will be apparent from the following description when read in connection with the accompanying drawing which shows:

Fig. 1. A color chart representing three greatly magnified halftone dots made with typical colored printing inks.

Figure 2:
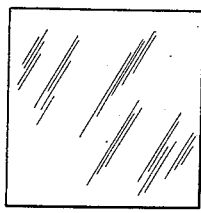

Fig. 2. A filter made according to one form of my invention.

In three-color photography and photomechanical process work for reproducing a multi-colored original, it is customary to make three color separation images by exposing three photographic layers to the primary colors reflected or transmitted by the original. The three primary colors, red, green, and blue, cannot and need not be exactly defined but are well known to those skilled in this art. The three corresponding subtractive or complementary colors, blue-green, magenta, and yellow are sometimes called blue, red, and yellow but this latter nomenclature and its accompanying confusion will be avoided in this specification. Some color processes employ three superimposed photographic layers; others use three separate films or plates. The various techniques are well known and need not be listed here. In so-called "additive" processes, color separation positives of the three primary colors are placed substantially in register by optical projection or by juxtaposition of elemental areas thereof such as in a color screen process. The present invention relates generally to the so-called "subtractive" processes which employ color separation positives in the three subtractive colors, yellow, magenta, and blue-green, and more particularly to the processes which employ three inks or similar coloring materials. The invention is particularly useful when a reproduction is made to be viewed by reflected light such as a print on paper.

For clarity, the following description will be confined to so-called "half-tone" processes wherein the printing density at any point is determined by the effective area of some elemental portion such as a halftone dot. The term "printing density" includes both continuous tone density and halftone density, the latter being related to the effecive printing area of individual halftone dots. The term "ink" refers to any coloring material of the types commonly used in the reproduction of a multi-colored scene, painting or color photograph.

The accompanying color chart (Fig. 1) represents three greatly enlarged halftone dots which overlap somewhat. A halftone image made up of a large number of such combinations can be considered as comprising a certain relative distribution of eight colors, or color patches as shown, namely, the inks "yellow, magenta, and blue-green," the areas where two dots overlap, "red, green, and blue," the areas where three dots overlap, "black," and the white of the support on which the picture is printed in reproduction. As is well known, due to deficiencies in the inks this "blue" appears purple and the "black" appears brown. The reflectivities (the ratio of the reflected light to incident light of any given color) corresponding to the eight colors will be referred to in this specification and the accompanying claims as "the reflectivities of the separate coloring materials and the reflectivity of the combined coloring materials and the reflectivity of the white support." Reflectivity depends on the color (i. e. the spectral distribution of energy), the incident light and the spectral sensitivity of the eye or photographic plate measuring the light intensities as well as on the properties of the coloring material being tested. Since the invention concerns only photographic rather than visual reflectivities, the phrase "reflectivity to primary red" means reflectivity, measured with a suitable photographic emulsion, for red light defined by the transmission of a so-called "red" filter illuminated with white light.

Since the colors of even the best contemporarily available yellow, magenta, and blue-green inks are not exactly minus-blue, minus-green, and minus-red, a certain amount of color correction by hand retouching or by masking is necessary if good color rendition is to be obtained.

As is well known, one common form of the masking method of color correction comprises making a color separation negative through one of the primary filters and superimposing in register on this negative, a mask consisting of a low contrast low density positive made from a negative taken through another filter which transmits one or both of the other primary colors. For example, the negative made through the primary red filter needs little if any masking; the negative made through the green filter may be masked with a positive corresponding to the negative made through the red filter; and the negative made through the blue filter may be masked with a positive whose negative was made through the green or a yellow filter. Although the color rendition when masking is employed, is much better than that in which no color correction is applied, it is still not perfect.

According to my invention better correction and more improved color rendition is provided by a method which employs a special set of filters instead of the usual three primary color filters in exposing the negatives. These special filters are constructed of such materials and/or employed in such a manner that they give color separation images particularly adapted to be masked with images made through other filters and to give color printers particularly suitable for a specified set of inks.

According to simple theory, any two coloring materials, such as two inks should, in combination, have a reflectivity which is the product of the separate reflectivities with respect to any given color. Practically, however, this is not the case and because of this, the ordinary masking method of color correction is not able to utilize the full abilities of available inks. This discrepancy between the reflectivity of the inks in combination to any given color and the product of the reflectivities of the separate inks to this color, will be discussed in greater detail below.

My invention will be more clearly understood from the following outline of one method of computing, from the primary color reflectivities of the particular inks which are to be used, the desirable spectral transmission characteristics of the color filters through which the color separation negatives are to be made and the amount and kind of masking to be employed. For purposes of the computation, the eight colors corresponding to the inks to be used in the reproduction of a multi-colored original are mounted beside the original, using the actual inks themselves and their white support. It is a natural and approximately true assumption that the best possible reproduction of the original will be obtained when those eight colors are exactly reproduced. Methods of making color printers according to my invention will be included in this sample computation.

*Example*

| Perfect printing densities | Ink patches | $D_b$ | $R_b$ | $D_b-6D_g$ | $.85R_b$ | $\frac{R_x}{.85R_b+.15R_g}$ | $D_x$ | $D_x-.6D_g$ | $\frac{R_y}{.8R_b+.2R_g}$ | $D_y$ | $D_y-.68D_g$ |
|---|---|---|---|---|---|---|---|---|---|---|---|
| | | | Percent | | | | | | | | |
| 1.50 | Yellow | .96 | 11.0 | .96 ( 1.50) | 9.4 | 24.4 | .61 | .61 (1.50) | 28.8 | .54 | .54 ( 1.50) |
| 1.50 | Y+M (red) | 1.27 | 5.4 | .58 ( .90) | 4.6 | 5.7 | 1.24 | .55 (1.35) | 5.7 | 1.45 | .46 ( 1.28) |
| 0 | Magenta | .64 | 22.9 | .04 (−.06) | 19.5 | 21.1 | .68 | .08 ( .20) | 20.3 | .69 | .01 ( .03) |
| 0 | M & BG (blue) | .95 | 11.2 | .07 ( .11) | 9.5 | 10.1 | 1.00 | .12 ( .30) | 9.7 | 1.01 | .02 ( .06) |
| 0 | Blue green | .40 | 39.8 | −.03 (−.05) | 33.8 | 34.3 | .46 | .03 ( .07) | 35.7 | .45 | −.03 (−.08) |
| 1.50 | BG+Y (green) | 1.20 | 6.3 | .66 ( 1.03) | 5.4 | 7.3 | 1.14 | .60 (1.48) | 7.6 | 1.12 | .51 ( 1.41) |
| 1.50 | BG+Y+M (black) | 1.44 | 3.6 | .54 ( .85) | 3.1 | 3.6 | 1.44 | .54 (1.33) | 3.6 | 1.44 | .44 ( 1.22) |
| 0 | White | 0 | 100 | 0 ( 0 ) | 85 | 100 | 0 | 0 ( 0 ) | 100 | 0 | 0 ( 0.0 ) |

| D (perfect) | Ink patches | $D_g$ | $R_g$ | $.6D_r$ | $D_g-.62D_r$ | $.15R_g$ | $.8R_g$ | $\frac{R_s}{.8R_g+.2R_r}$ | $D_s$ | $D_s-.66D_r$ |
|---|---|---|---|---|---|---|---|---|---|---|
| | | | Percent | | | | | | | |
| 0 | Yellow | 0 | 100 | 0 | 0 ( 0 ) | 15.0 | 80 | 100 | 0 | 0 ( 0 ) |
| 1.50 | Y+M (red) | 1.14 | 7.2 | .69 | 1.08 ( 1.50) | 1.08 | 5.8 | 22.1 | .66 | .60 ( 1.50) |
| 1.50 | Magenta | 1.00 | 10.0 | .60 | .97 ( 1.35) | 1.50 | 8.0 | 25.4 | .60 | .56 ( 1:40) |
| 1.50 | M+BG (blue) | 1.46 | 3.5 | .88 | .60 ( .83) | .52 | 2.8 | 3.6 | 1.44 | .53 ( 1.33) |
| 0 | Blue green | .71 | 19.5 | .45 | −.02 (−.03) | 2.92 | 15.6 | 17.0 | .77 | .00 ( 0 ) |
| 0 | BG+Y (green) | .89 | 12.9 | .53 | .03 ( .04) | 1.94 | 10.3 | 11.1 | .90 | −.01 (−.02) |
| 1.50 | BG + Y + M (black) | 1.50 | 3.2 | .90 | .63 ( .88) | .48 | 2.6 | 3.4 | 1.47 | .55 ( 1.37) |
| 0 | White | 0 | 100 | 0 | 0 ( 0 ) | 15 | 80 | 100 | 0 | 0 ( 0 ) |

| D (perfect) | Ink patches | $D_r$ | $R_r$ | $1.07D_r$ | $.62D_r$ | $.2R_r$ | $.66D_r$ |
|---|---|---|---|---|---|---|---|
| | | | Percent | | | | |
| 0 | Yellow | 0 | 100 | 0 | 0 | 20 | 0 |
| 0 | Y+M (red) | .09 | 81.5 | .1 | .06 | 16.3 | .06 |
| 0 | Magenta | .06 | 87.0 | .06 | .04 | 17.4 | .04 |
| 1.50 | M+BG (blue) | 1.38 | 4.2 | 1.48 | .86 | .84 | .91 |
| 1.50 | Blue green | 1.17 | 6.8 | 1.25 | .73 | 1.36 | .77 |
| 1.50 | BG+Y (green) | 1.38 | 4.2 | 1.48 | .86 | .84 | .91 |
| 1.50 | BG+Y+M (black) | 1.40 | 4.0 | 1.50 | .87 | .80 | .92 |
| 0 | White | 0 | 100 | 0 | 0 | 20 | 0 |

The above table shows a computation made from the actual densities of the eight colors corresponding to three typical inks and with respect to three primary colors as defined by three primary color filters which I chose for the purpose. The red filter is that known as Wratten Light Filter No. 25. The green filter is that known as Wratten Light Filter No. 61 and the blue filter is that known as Wratten Light Filter No. 47. These particular filters were chosen to meet the general requirements that a primary color filter should sharply define a certain known portion of the spectrum. Similar computations can be made for any similar inks and set of filters. The letter D as it appears at the head of certain columns refers to density. The letter R similarly refers to reflectivity, and the subscripts refer to the filter through which the density or reflectivity was measured. For instance $D_b$, $D_g$ and $D_r$ are the densities measured through the #47, #61 and #25 filters respectively.

Since the invention is concerned only with photomechanical processes, these densities were measured photographically using film or plates having the spectral sensitivity of the material with which the separation negatives are to be made.

Using the white support upon which the multicolored original is to be reproduced, I printed a group of overlapping color spots and measured the reflectivities of the separate coloring materials and the coloring material in combination, with respect to the three primary colors as defined by the above listed filters. The actual density readings obtained are indicated in the columns $D_b$, $D_g$, and $D_r$ for the three primary colors respectively. The corresponding reflectivities are given in the columns $R_b$, $R_g$, and $R_r$. Following the usual conventions, I use the terms "absorption" to mean $1-R$ (reflectivity expressed as a fraction) and "opacity" to mean $1/R$. Density is the logarithm of opacity. For the purposes of this typical computation, I am considering only the straight-line portions of the characteristic curves of photographic emulsions. When a photographic emulsion is developed to a low contrast the relative densities of the image are reduced proportionately; such effects are indicated in the above table by multiplying the densities by a factor equal to the photographic contrast. In one form of the masking method of color corrections, as discussed above, a positive is made from the negative which is taken through the primary green filter and this mask is processed to be of low contrast, say gamma $(\gamma) = .6$. For purposes of computation, the effect of masking a negative taken through a blue filter with a positive corresponding to the green filter, when employed with these particular inks can be represented by subtracting corresponding densities as shown in the column $D_b - .6D_g$. By increasing the development when making a photographic image, the relative densities of the various portions are increased proportionally. For purposes of comparison, the computations made in the above table are corrected to a maximum density of 1.50 by multiplying by a suitable factor (corresponding to developing to a suitable contrast), as indicated by bracketed numbers accompanying the various density columns.

The eight colors on the chart mounted adjacent to the original will reproduce perfectly if the amount of each ink in the reproduction is equal to the amount of the same ink in the corresponding point on the chart. This condition is obtained with a "perfect" printer having densities to the three primary colors as indicated in the column at the extreme left of the above table.

It is obvious that even when employing the masking method, this theoretically perfect ratio of the effective densities is not approximated very closely, as shown by comparison of the $D_b - .6D_g$ column with the perfect printing densities.

I have found that the correction obtained by the masking method would be approximately perfect if the reflectivities of the coloring materials in combination equaled the product of the reflectivities of the corresponding coloring materials separately. For convenience in the accompanying claims, I refer to this as the product law of the eight reflectivities. It will be seen from the above table that this is not so, namely $R_b$ for the red patch is not equal to $R_b$ for the yellow patch times $R_b$ for the magenta patch (i. e., $D_b$ yellow plus $D_b$ magenta is not equal to $D_b$ red).

According to one form of my invention as illustrated in general by Fig. 2, I provide a bluish filter which transmits primary blue and primary green in the ratio of 85 to 15. In the above table I refer to this filter as X. As shown in the table, the reflectivities of the eight colors to the color of the X filter equals $.85 R_b + .15 R_g$. The corresponding densities are given in the column $D_x$. It will be noted that the discrepancies between the reflectivities of the coloring materials in combination and the product of the reflectivities of the separate coloring materials is appreciably reduced.

The units expressing the amounts of the primary colors as defined by the filters chosen, are such that equal quantities have equal effect on the panchromatic emulsion used. It will be obvious that such units take care of the filter factors of the emulsion.

If a color separation negative were made through an X filter, masked with a $.6 D_g$ positive as before and employed with these particular inks, the degree of correction is indicated in the column $D_x - .6D_g$. It will be noted that the figures in this column are approximately proportional to the perfect printer densities and also that my invention has thus provided a method of color reproduction which gives a much better rendition of the eight colors mounted by the original than that obtained by the masking method when the original color separation negative is made through a primary color filter. This is due to the fact that the effective densities of the colors requiring a solid tone of yellow ink in their reproduction are high and equal.

Because of numerous variations which appear in the practice of any photomechanical process, it is sometimes not worth while to reduce the deviations from perfect much beyond that shown in this $D_x - .6D_g$ column. However, the effect of a filter "Y" which transmits primary blue light and primary green light in the ratio of 4 to 1 is given for purposes of comparison. In practicing my invention I prefer to repeat my calculations using two or three ratios of the two primary colors. It is not necessary that both of these colors be primary colors, but I have found that the best results are obtained when the color which is added to the primary corresponding to the printer being made is the same color as that of the filter corresponding to the mask used in making this printer. For example, if the blue filter negative were to be masked with a yellow filter positive instead of a green filter positive as described above, the bluish filter used in making this negative should, according to the preferred embodiment of my invention transmit blue and yellow in the proportion of say, 8 to 1.

According to a different embodiment of my invention, each color separation negative is made by successively exposing a photographic film or plate to a primary color reflected from the original and then to the color reflected from the original corresponding to the mask which is to be used with that negative. For example, in the first case shown in the above table, the "blue" filter negative is exposed through a blue filter for a certain time and then through a green filter for a relatively short time; the times being in the ratio of 85:15, if the filter factors of the emulsion for the blue and green filters are equal. The ratio is modified by the ratio of these filter factors when they are unequal. By this method, a color separation negative is obtained capable of utilizing the full benefits of the masking method of color correction.

The above table includes similar computations for the green and red filter negatives. In the case of the green filter negative, a Z filter transmitting green and red in the ratio of 4:1 is shown to be appropriate for these particular inks and to give a negative suitable to be masked by red filter positive of .66 contrast. In the case of the red filter negative, the figures in the 1.07 $D_r$ column indicate that the eight colors for these inks have an approximately correct effective density to red light and hence masking is not necessary.

It will be noted by those skilled in this art that the above tabular method lends itself particularly well to the making of these computations, especially since certain approximations are allowable and in some instances cannot be avoided. Once a set of color filters has been computed as described above, no further computations are needed when using this set of links and the photographic emulsion by which their reflectivities were measured. Furthermore many printing inks commercially available at present differ only to a small extent and hence the same set of filters is useful with various commercial sets of inks.

It is customary in the making of gelatin color filters, to determine the desired spectral transmission of the filter and then to choose (from experience and by tests dictated by this experience) a suitable coloring material which will impart to the gelatin this particular spectral transmission.

Having thus described methods of making color separation negatives particularly suitable to be masked and a set of filters made in accordance with my invention from the reflectivities of the inks to be employed, I wish to point out that my invention is not limited to these particular examples but is of the scope of the appended claims.

What I claim and wish to secure by Letters Patent of the United States is:

1. A filter for making a color separation negative for use in photomechanical process work employing three subtractive-color coloring materials having known reflectivities separately and in combination to the three primary colors, said filter transmitting one of the primary colors and sufficient of at least one other of the primary colors that, with respect to the color of said filter, the reflectivities of said coloring materials in combination are approximately equal to the respective products of the reflectivities of the separate materials.

2. A set of filters for making color separation negatives in a three color photomechanical process wherein masking is employed, said set consisting of a primary red filter, a filter transmitting only primary green and primary red substantially in the ratio of four to one and a filter transmitting only primary blue and primary green substantially in the ratio of four to one.

3. A set of filters for making the three color separation negatives for use in a three color photomechanical process wherein the green separation negative is masked by a thin primary red separation positive and the blue separation positive is masked by a thin primary green separation positive and wherein the final print is made with yellow, magenta and blue green pigments having known reflectivities separately and in combination to the three primary colors, said set of filters comprising a primary red filter, a filter transmitting only primary green and primary red in the ratio $R_1$ and a filter transmitting only primary blue and primary green in the ratio $R_2$ where $R_1$ and $R_2$ are such that, to the colors transmitted by these filters, the discrepancies between the reflectivties of the pigments in combination and the product of the reflectivities of the separate materials are substantially a minimum.

4. A set of filters for making the three color separation negatives for use in a three color photomechanical process wherein the green separation negative is masked by a thin primary red separation positive and the blue separation negative is masked by a thin color-separation-positive corresponding to at least one of the primary colors red and green, and wherein the final print is made on a white support with yellow, magenta, and blue green pigments having known reflectivities separately and in combination to the three primary colors, said set of filters comprising a primary red filter, a second filter transmitting only primary green and primary red in the ration $R_1$ and a third filter transmitting only primary blue and the color corresponding to the mask which masks the blue separation negative, in the ratio $R_2$ where $R_1$ and $R_2$ are such that the values of the reflectivities of the pigments as measured through these filters and as modified proportional to the effects of the corresponding masks, substantially obey the rule that these values should in the case of the second filter be low and equal for the magenta pigment and combinations with the magenta pigment and should be high and equal for the other pigments, their combination and said support and the rule that these values should in the case of the third filter be low and equal for the yellow pigment and combinations with the yellow pigment and should be high and equal for the other pigments their combination, and said support.

5. A filter for making the blue separation negative to be used in a photomechanical process wherein the blue separation negative is masked by a thin color separation positive corresponding to primary green or to both primary green and primary red and wherein the final print is made on a white support with yellow magenta and blue green pigments having known reflectivities separately and in combination to the three primary colors said filter transmitting substantially only primary blue and the color corresponding to said thin positive in the ratio R where R is such that, to the color transmitted by this filter, the values of the reflectivities of the yellow pigment and combinations with the yellow pigment as modified by said thin positive mask are low and equal and the values of the reflectivities of the other pigments, their combination and the support are high and equal.

6. A filter for making the green separation negative to be employed in a photomechanical process and to be masked by a thin primary red separation positive, said filter transmitting only primary green and primary red substantially in the ratio of four to one.

7. A filter for making a color separation negative to be used in a photomechanical process wherein said negative corresponds approximately to one of the primary colors and is masked by a thin color separation positive corresponding to at least one of the other primary colors and wherein the final print is made on a white support with yellow, magenta and blue green pigments having known reflectivities separately and in combination to the three primary colors, said filter transmitting substantially only said one of the primary colors and the color corresponding to said thin positive in the ratio R where R is such that, with respect to the color of said filter, the reflectivities of said pigments in combination are approximately equal to the respective products of the reflectivities of the separate pigments.

8. A filter for making a color separation negative to be used in a photomechanical process wherein said negative corresponds approximately to one of the primary colors and is masked by a thin color separation positive corresponding to at least one of the other primary colors and wherein the final print is made on a white support with yellow, magenta and blue green pigments having known reflectivities separately and in combination to the three primary colors, said filter transmitting substantially only said one of the primary colors and the color corresponding to said thin positive in the ratio R where R is such that, to the color transmitted by this filter, the values of the reflectivities of the pigment complementary to said one of the primary colors and combinations with this pigment, as modified by said thin positive mask, are low and equal and the values of the reflectivities of the other pigments, their combination and the support are high and equal.

JOHN A. C. YULE.